US012565434B2

(12) United States Patent
Burba

(10) Patent No.: US 12,565,434 B2
(45) Date of Patent: Mar. 3, 2026

(54) PREVENTION OF SILICA FOULING IN GEOTHERMAL BRINE

(71) Applicant: International Battery Metals, Ltd., Houston, TX (US)

(72) Inventor: John L. Burba, Houston, TX (US)

(73) Assignee: International Battery Metals, Ltd., Houston, TX (US)

( * ) Notice: Subject to any disclaimer, the term of this patent is extended or adjusted under 35 U.S.C. 154(b) by 0 days.

(21) Appl. No.: 18/652,446

(22) Filed: May 1, 2024

(65) Prior Publication Data

US 2025/0340465 A1 Nov. 6, 2025

(51) Int. Cl.
*C02F 1/70* (2023.01)
*C02F 1/26* (2023.01)

(52) U.S. Cl.
CPC .................. *C02F 1/70* (2013.01); *C02F 1/26* (2013.01); *C02F 2201/005* (2013.01); *C02F 2209/001* (2013.01); *C02F 2209/006* (2013.01); *C02F 2209/04* (2013.01); *C02F 2209/26* (2013.01); *C02F 2209/40* (2013.01)

(58) Field of Classification Search
None
See application file for complete search history.

(56) References Cited

U.S. PATENT DOCUMENTS

| | | | |
|---|---|---|---|
| 9,499,417 B1 * | 11/2016 | Handy ...................... | C02F 1/42 |
| 2003/0198589 A1 * | 10/2003 | Symens ................... | C01D 3/12 |
| | | | 423/491 |
| 2010/0206744 A1 * | 8/2010 | Pereira ................ | C02F 1/46114 |
| | | | 205/687 |
| 2010/0314316 A1 * | 12/2010 | Yin ......................... | A01N 37/30 |
| | | | 210/636 |
| 2013/0161265 A1 * | 6/2013 | Fox .......................... | C23F 11/08 |
| | | | 210/85 |
| 2014/0239221 A1 * | 8/2014 | Harrison ................. | C22B 19/00 |
| | | | 166/305.1 |
| 2017/0241930 A1 * | 8/2017 | Roberts .............. | G01N 33/2823 |
| 2019/0314243 A1 * | 10/2019 | MacCallum ........ | H04L 12/2816 |

* cited by examiner

*Primary Examiner* — Richard C Gurtowski
(74) *Attorney, Agent, or Firm* — Snell & Wilmer L.L.P.

(57) ABSTRACT

Described herein are systems and techniques for monitoring and controlling values of oxidation reduction potential (ORP) of brine provided to a separation system. Brine that includes valuable elements, such as lithium, may also include levels of silica and transition metals like iron that could react with oxygen to create insoluble compounds that could clog apparatus designed to remove lithium from brines. Systems and techniques of the present disclosure may control ORP values by adding measures of reducing agents to brine to prevent formation of the insoluble compounds, such as ferrosilicate that can be formed from an oxidation reaction of ferrous iron ($Fe^{+2}$) and silicate. Techniques of the present disclosure may generate, train, and use computer models to control ORP values of brine.

17 Claims, 4 Drawing Sheets

200

300

PREVENTION OF SILICA FOULING IN GEOTHERMAL BRINE

TECHNICAL FIELD

The present disclosure is generally directed to processing of geothermal brines. More specifically, the present disclosure is directed to preventing silica fouling in geothermal brines using an oxidation-reduction potential.

BACKGROUND

Elements such as lithium are growing in demand today. One source for such elements is brines that are located beneath the surface of the Earth. In certain instances, such brines may include silica and metals (e.g., iron) that react to form insoluble compounds. For example, silica may combine with ferrous iron ($Fe^{+2}$) to form ferrosilicate (FeSi). When subterranean brines are moved to the surface and are provided to processing equipment, oxygen may be introduced into the brine. The presence of the oxygen may cause transition metals like iron to oxidize, and a chemical reaction associated with this oxidation may form insoluble compounds that clog pipes and/or processing equipment.

BRIEF DESCRIPTION OF THE DRAWINGS

In order to describe the manner in which the features and advantages of this disclosure can be obtained, a more particular description is provided with reference to specific implementations thereof which are illustrated in the appended drawings. Understanding that these drawings depict only exemplary implementations of the disclosure and are not therefore to be considered to be limiting of its scope, the principles herein are described and explained with additional specificity and detail through the use of the accompanying drawings in which.

DETAILED DESCRIPTION

Figure 1:
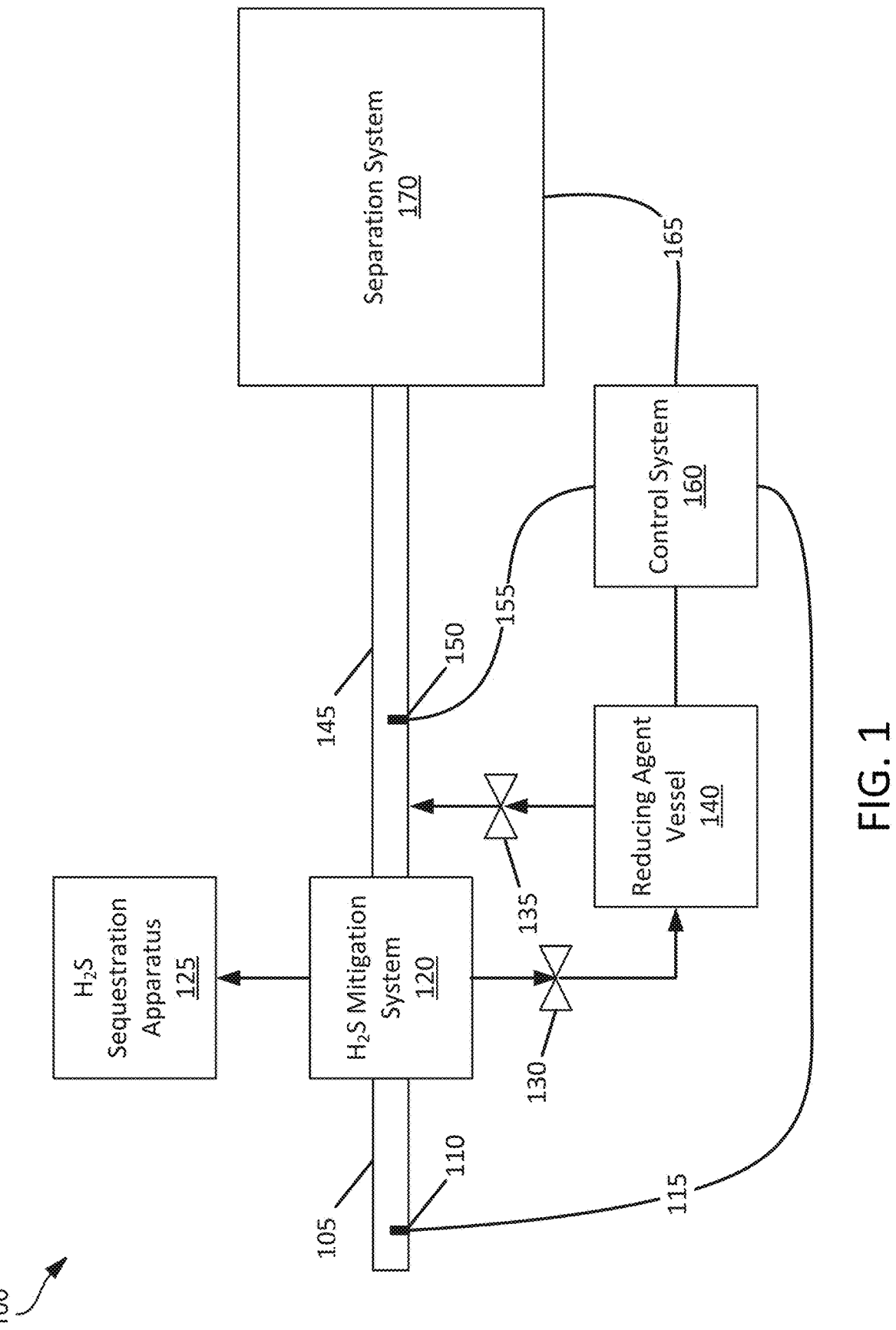
FIG. 1 illustrates an example system environment for controlling an oxidation-reduction potential of a brine that is provided to a separation system, in accordance with various aspects of the subject technology.

Various aspects of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous compounds. In addition, numerous specific details are set forth in order to provide a thorough understanding of the methods and apparatus described herein. However, it will be understood by those of ordinary skill in the art that the methods and apparatus described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the present disclosure.

After brine is sourced from a brine source like a subterranean reservoir, gasses not initially included in the brine may mix with the brine and other gasses may escape from the brine. When brine is brought from a location relatively devoid of oxygen to an area where oxygen is plentiful (e.g., from beneath the Earth's surface to the Earth's surface), oxygen included in the air at the Earths' surface may mix with the brine. For example, when silica in brine solution (e.g., geothermal brines) is combined with transition metal species such as $Fe^{-3}$, ferric iron in native brine (e.g., $Fe^{-2}$) may react with silica to form insoluble ferrosilicate (FeSi). When ferrosilicate is formed (e.g., formed as insoluble coatings) in or on the surface of pipes that transport the brine or processing equipment that processes the brine (e.g., extraction medium), the ferrosilicate may clog or fowl the pipes and processing equipment. Once these pipes and/or processing equipment are sufficiently clogged, they will be rendered useless to their intended purpose.

Furthermore, subterranean brines may include compounds that are toxic. For example, they may include hydrogen sulfide ($H_2S$) that can potentially escape as a gas from the brine and provide a safety risk to individuals working near a processing facility. Because of dangers provided by $H_2S$ gas and since $H_2S$ may be found in materials sourced from subterranean locations, levels of $H_2S$ included in brines extracted from the Earth may be regulated by Federal and/or State regulations or laws. Such regulations or laws may identify a maximum concentration of toxic chemicals that may be passed along in substances that are processed.

Described herein are systems, apparatuses, processes (also referred to as methods), and computer-readable media (collectively referred to as "systems and techniques") for monitoring and/or controlling the chemistry of subterranean brines to prevent and/or mitigate negative side effects associated with the formation of insoluble silicate-based compounds and/or an overabundance of toxic gasses. For example, systems and techniques of the present disclosure may process geothermal brines based on an oxidation reduction potential (ORP) of the brines to prevent silica fouling.

In some examples, the systems and techniques of the present disclosure can control the ORP in the brine to prevent oxidation of transition metal species. For example, one or more "reducing agents" may be used to control values of ORP of a brine solution. Brines that include silica and metals like iron can be prevented from forming silicate compounds (e.g., ferrosilicate) by maintaining ORP values according to a processing rule. That is, one or more reducing agents may be added to brine to maintain an ORP value at a desired level. For example, a reducing ORP can be maintained by adding a reducing agent including sodium sulfite ($Na_2So_3$) to react with free oxygen that mixes with brine.

Further, some brines may contain significant quantities of hydrogen sulfide ($H_2S$), which is a reducing agent. If $H_2S$ remains in the brine, transition metals such as iron may remain in the +2 oxidation state and will not react with silica, and therefore silica fouling can be prevented. When $H_2S$ is present in subterranean brines, it may be present at levels or concentrations that are unsafe or that do not conform to safety laws, regulations, or rules. In some examples, the systems and techniques of the present disclosure can regulate or control levels or concentrations of $H_2S$ that can be included in a particular flow or volume of brine based on a processing rule. In such instances, excess $H_2S$ may be removed from the brine such that the excess $H_2S$ can be safely disposed of. One way in which $H_2S$ may be disposed of is that it may be sequestered in subterranean formations by pumping the $H_2S$ with other waste materials down a wellbore.

In some aspects, systems and techniques of the present disclosure may maintain values of ORP within a range. A first threshold of this range may identify a maximum ORP value that will prevent silica and metals reacting, for example, when oxygen is present. A second threshold of this range may correspond to a maximum allowable concentration or level of $H_2S$ included in a volume of brine. A maximum allowable concentration or level of $H_2S$ can include at least 1 part per million, 5 to 10 parts per million, 5 to 20 parts per million, or another applicable amount or range of concentrations or levels.

In some cases, when a brine is provided to a system of the present disclosure or after a geothermal brine exits a geothermal power plant, a sensor may sense the ORP of the brine. A control system may receive a voltage or data from the sensor (e.g., an ORP sensor or ion chromatograph) and a processor of the control system may identify an ORP value to associate with the incoming brine. In one instance, reducing agents may be added to brine to maintain the bring ORP value within the range of ORP values. In another instance, $H_2S$ may be removed from the brine to maintain the brine ORP value within the range of ORP values. In some instances, $H_2S$ may be removed while reducing agents are added to the brine. Non-limiting examples of a reducing agent can include $H_2S$, sodium sulfide, and other applicable agents that can facilitate maintenance of an ORP in the strip water that is reducing.

In some aspects, a cation exchange chelating resin can be utilized to remove iron and other transition metals from the brine before the brine is exposed to oxygen. Once these metal ions have been removed from the brine, $H_2S$ can be removed via air flux. The $H_2S$ can then be captured by amine extraction systems or similar processes. In some cases, it can then be reinjected into lithium-depleted brine. Moreover, silica can be removed from the raw brine, containing $H_2S$, to achieve the same goals. Regenerated silica can be disposed of based on various methods including reinjection into brine that has undergone lithium extraction.

In some examples, a similar process can be employed utilizing an anion exchange resin that is capable of extracting silicate from the brine.

In some cases, some inorganic materials (e.g., aluminum hydroxide) may be employed to capture the silicate while it is still in the $H_2S$ enriched brine.

Aspects of the present disclosure can provide solutions for monitoring and controlling brines to safely and economically separate elements in the brines from other compounds. For example, instead of oxidizing metals such as iron, the present disclosure can maintain sufficient ORP in the brine to prevent oxidation of transition metal species by having the silica and metal species in the same redox conditions as they are in the source brine. If the ORP is properly maintained, metallosilicates may not form and the silica will be less likely to foul extractants and equipment.

FIG. 1 illustrates an example system environment 100, which comprises components that may be used to control the oxidation reduction potential (ORP) of a brine that is provided to a separation system.

In some examples, brine from a brine source (e.g., geothermal brines) may be provided via pipe 105 to an $H_2S$ mitigation system 120. The components included in FIG. 1 also include sensors 110 and 150, valves 130 and 135, reducing agent vessel 140, pipe 145, and control system 160. Voltages or data sensed by sensor 110 may be provided to control system 160 via coupling 115. Voltages or data sensed by sensor 150 may be provided to control system 160 via coupling 155. Other sensors not shown in FIG. 1 may be located within separation system 170. Voltage or data from these other sensors may be provided to control system 160 via coupling 165. Couplings 115, 155, and 165 may be cables capable of carrying/transmitting analog signals or digital data. Alternatively, or additionally, data may be provided to control system 160 using any applicable wireless transmissions.

In some aspects, sensor 110 may determine whether $H_2S$ is present in brine based on sensor data from which a concentration of $H_2S$ may be identified. For example, sensor 110 can be used to identify a value of ORP of the incoming brine. In some cases, $H_2S$ mitigation system 120 may remove a portion of the $H_2S$ included in the brine received from pipe 105. The $H_2S$ removed from the brine may be sequestered by $H_2S$ sequestration apparatus 125, for example by pumping it underground with other waste materials. The arrowed line leading from $H_2S$ mitigation system 120 to $H_2S$ sequestration apparatus 125 may be a pipe used to transport $H_2S$ from $H_2S$ mitigation system 120 to $H_2S$ sequestration apparatus 125.

Alternatively, or additionally, $H_2S$ may be provided from $H_2S$ mitigation system 120 to reducing agent vessel 140 based on operation of valve 130. In such instances, the arrowed lines connecting $H_2S$ mitigation system 120 to reducing agent vessel 140 may be pipes that transport controlled volumes or amounts/masses of $H_2S$ to reducing agent vessel 140.

In some cases, control system 160 may control, based on sensor data, the operation of $H_2S$ mitigation system 120, valve 130, or the flow of brine through pipe 105. When $H_2S$ mitigation system 120 operates, data sensed from sensor 110 may be compared with data sensed by sensor 150. Operation of $H_2S$ mitigation system 120 may be controlled based on differences between data sensed by sensor 110 and data sensed by sensor 150.

In some examples, sensor 150 may sense values of ORP of brine provided via pipe 145 to separation system 170. Control system 160 may evaluate sensed data to identify whether one or more reducing agents should be provided to pipe 145. When one or more reducing agents should be provided to pipe 145, control system may open valve 135 to allow reducing agents to move from reducing agent vessel 140 to pipe 145 as indicated by the arrows that connect reducing agent vessel 140 to pipe 145. In such instances, a value of ORP of the brine in pipe 145 may be controlled to stay within a range of acceptable ORP values. This range of acceptable ORP values may be specified by one or more rules associated with operation of control system 160. These rules may maintain ORP values to prevent formation of silicate compounds. Further, based on such rules, $H_2S$ concentrations can be maintained at a certain level to meet laws, regulations, or rules to enhance safe operation of separation system 170.

Figure 2:
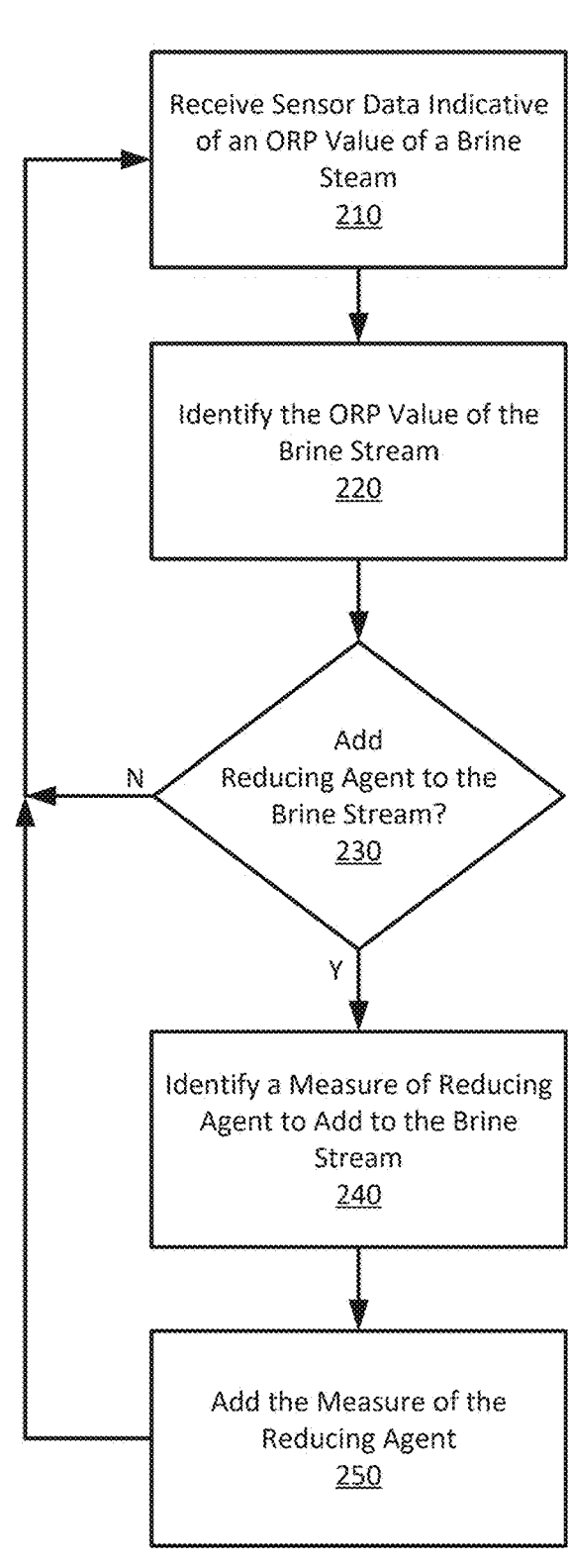
FIG. 2 illustrates an example process for controlling an oxidation reduction potential of a stream of brine, in accordance with various aspects of the subject technology.

FIG. 2 is a flowchart illustrating an example process 200 for controlling the oxidation reduction potential (ORP) of a stream of brine. Although the example process 200 depicts a particular sequence of operations, the sequence may be altered without departing from the scope of the present disclosure. For example, some of the operations depicted may be performed in parallel or in a different sequence that does not materially affect the function of process 200. In other examples, different components of an example device or system that implements process 200 may perform functions at substantially the same time or in a specific sequence.

At block 210, process 200 includes receiving sensor data indicative of an ORP value of the brine stream. For example, a control system such as the control system 160 of FIG. 1 can receive sensor data (sensor data captured by sensors 110, 150) that is indicative of an ORP value of the brine stream (e.g., brine that is introduced into pipe 105, 145). This sensor data may be an analog output of a sensor (e.g., a voltage) or could be a digital value. One or more processors of the control system may receive the sensor data either via an analog to digital converter (ADC), via one or more wires (e.g., a cable or bus), or via a wireless interface.

At block 220, the one or more processors may identify the ORP value of the brine stream from the sensor data.

In some aspects, the ORP value of the brine stream may be compared to one or more ORP range value thresholds. These ORP values may be recorded or otherwise provided for use to train or operate a computer model.

Determination block 230 may then identify whether a reducing agent should be added to the brine stream. When determination block 230 identifies that the reducing agent should not be added to the brine stream, program flow may move back to block 210 where additional sensor data is received. When determination block 230 identifies that the reducing agent should be added to the brine stream a measure of the reducing agent to add to the brine stream may be identified at block 240.

A measure of reducing agent added to the brine stream may be a function of metrics that may include a current ORP value of the brine stream, a rate of change overtime of ORP values at an input of a processing system, values of ORP of a specific type of reducing agent, a volumetric density or molar mass of the brine stream, and/or a volumetric or molar mass of the brine stream per unit time. Calculations may be performed using one or more of these or other metrics when the measure of reducing agent to add to the brine stream is identified. The measure of reducing agent may correspond to a volume of the reducing agent and/or a molar mass of the reducing agent. When a computer model is used, data may be collected over time and processors that execute instructions of the computer model may evaluate the collected data to identify patterns, rates of change, or other information associated with brine provided to the system and with controlling ORP values of a brine stream. Historical patterns, rates of change, and/or other information may be used to train the computer model to identify how measures of reducing agents to add to the brine stream when the ORP values are controlled. For example, operation of the computer model may result in a processor increasing a molar mass of reducing agent provided to the brine stream when ORP values of the brine stream are increasing at a given rate over a time period or visa versa. In certain instances, an alarm may be raised, for example when ORP values change to an extent that indicates that an excessive amount of oxygen has leaked into the brine stream. This alarm may be raised when an ORP value reaches a warning threshold or when a rate of change of ORP values over time is observed. Such an alarm may cause messages to be sent to operators or may cause a flow of the brine to be terminated.

At block 250, the measure of reducing agent identified at block 240 may be added to the brine stream. Program flow may then move back to block 210 where additional sensor data is received. The actions performed in FIG. 2 may control ORP values dynamically over time as brine is received from a brine source to maintain ORP values commensurate with a threshold value of ORP or within a desired range of ORP values.

Figure 3:
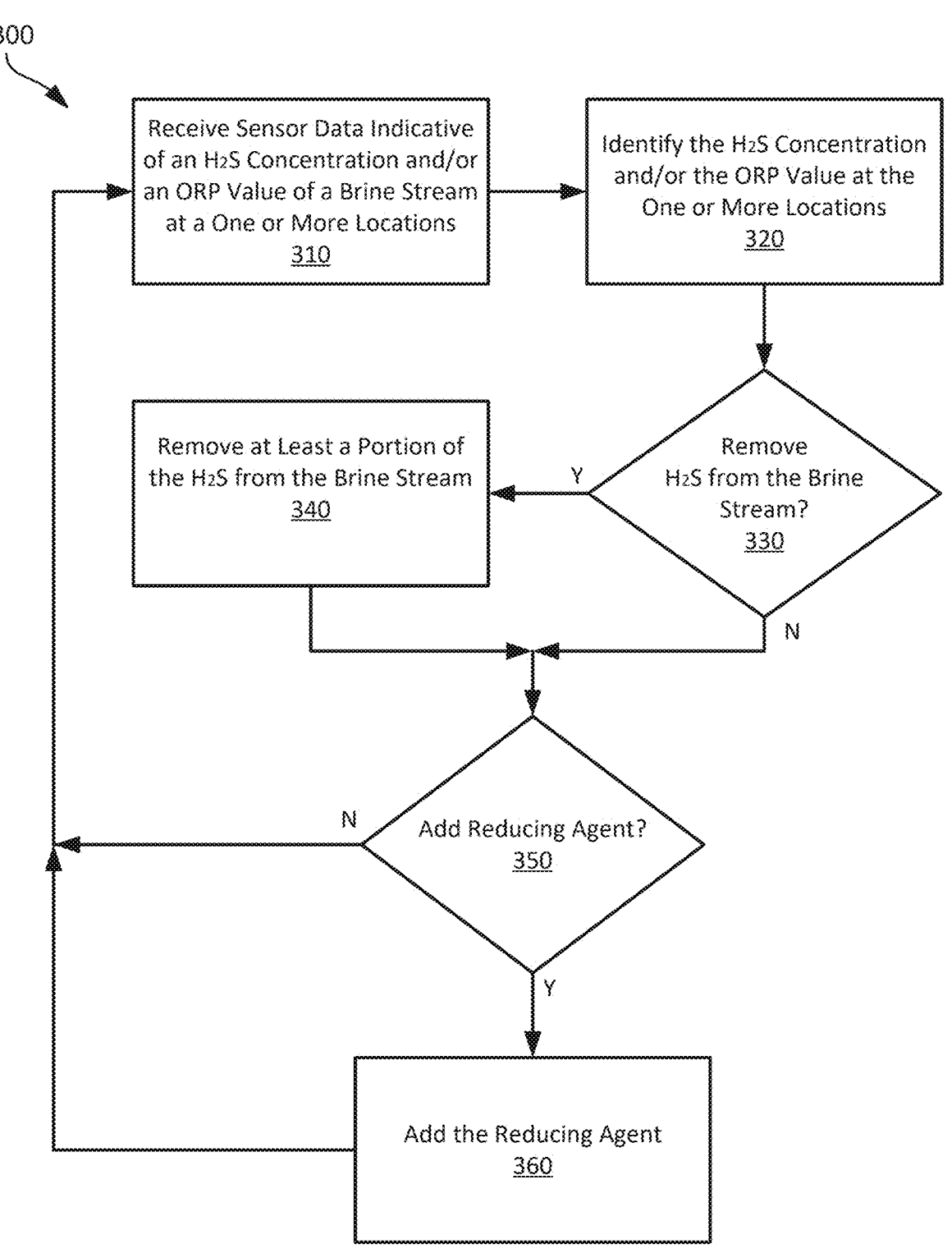
FIG. 3 illustrates controls an example process for controlling concentrations of hydrogen sulfide and the oxidation reduction potential of a stream of brine, in accordance with various aspects of the subject technology.

FIG. 3 is a flowchart illustrating an example process 300 for controlling concentrations of hydrogen sulfide ($H_2S$) and the oxidation reduction potential (ORP) of a stream of brine. The example process 300 may be performed by one or more processors of the control system 160 of FIG. 1 or a computer model. Although the example process 300 depicts a particular sequence of operations, the sequence may be altered without departing from the scope of the present disclosure. For example, some of the operations depicted may be performed in parallel or in a different sequence that does not materially affect the function of process 300. In other examples, different components of an example device or system that implements process 300 may perform functions at substantially the same time or in a specific sequence.

At block 310, sensor data may be received or accessed. This sensor data may be indicative of $H_2S$ concentrations and/or ORP values at one or more locations of a system that controls $H_2S$ concentrations and ORP values.

The sensor data received at block 310 may be evaluated at block 320 to identify the $H_2S$ concentration and/or the ORP value of the brine stream at an input of a processing system. For example, $H_2S$ concentrations and/or the ORP value of the brine stream in pipe 105 of FIG. 1 may be identified.

Determination block 330 may identify whether at least a portion of the $H_2S$ should be removed from the brine stream, when yes, that portion of the $H_2S$ may be removed from the brine stream via the $H_2S$ mitigation system 120 of FIG. 1. Any $H_2S$ removed from the brine stream may be sequestered as discussed in respect to FIG. 1. In certain instances, some $H_2S$ may be stored in a vessel for use as a reducing agent that can be added back into the brine stream such that ORP values can be maintained according to a rule. One or more valves may be used to control flows of $H_2S$ removed from the brine stream.

When determination block 330 identifies that the $H_2S$ should not be removed from the brine stream or after the portion of $H_2S$ is removed from the brine stream at block 340, program flow may move to block 350 that identifies whether a reducing agent should be added to the brine stream.

When determination block 350 identifies that a reducing agent should not be added to the brine stream, program flow may move back to block 310 where additional sensor data is received.

When determination block 350 identifies that the reducing agent should be added, the reducing agent may be added to the brine stream at block 360. This may include identifying a measure of reducing agent to be added to the brine stream as discussed in respect to FIG. 2.

After block 360, additional sensor data may be received at block 310. Operation of a system that controls $H_2S$ concentrations and ORP values may be modeled by a computer model such that operation of a control system may be improved over time.

Figure 4:
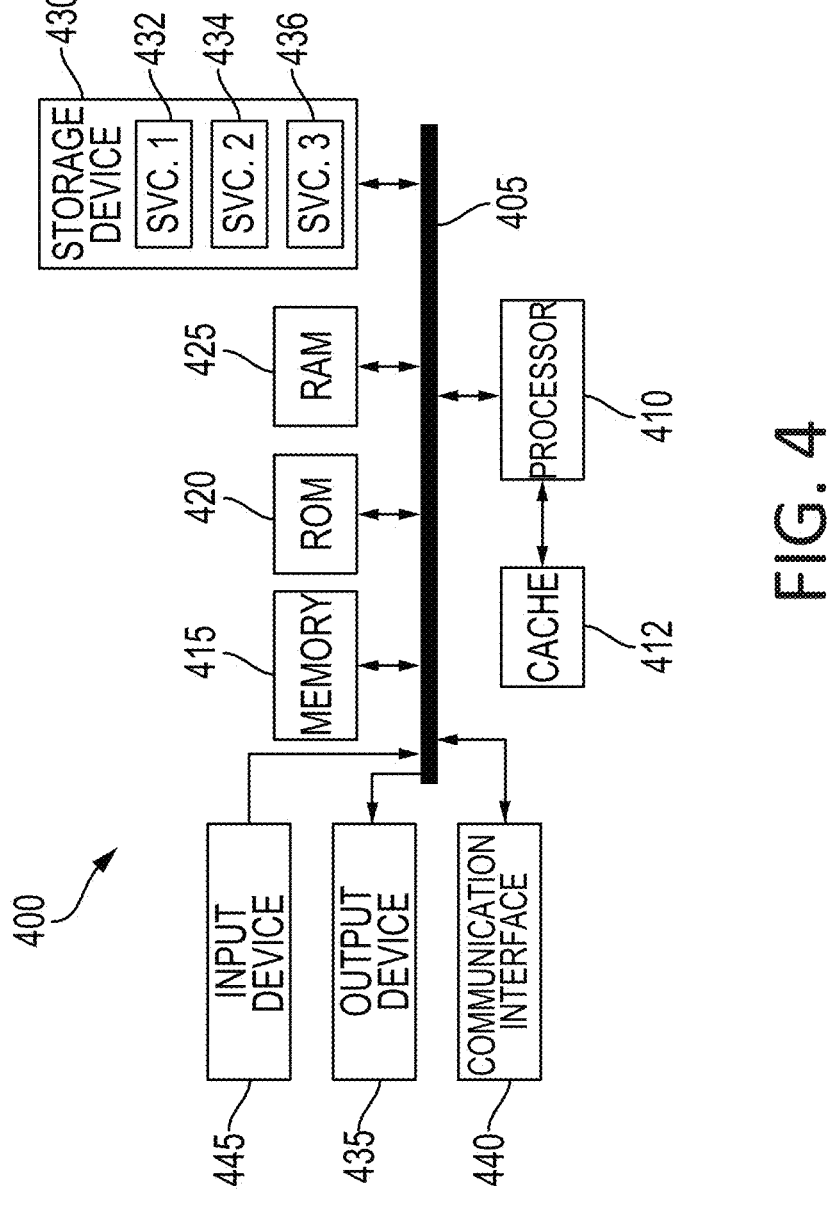
FIG. 4 illustrates an example computing device architecture which can be employed to perform any of the systems and techniques described herein.

FIG. 4 illustrates an example computing device architecture which can be employed to perform any of the systems and techniques described herein (e.g., $H_2S$ mitigation system 120, reducing agent vessel 140, control system 160, separation system 170, etc.). In some examples, the computing device 400 architecture can be integrated with tools described herein. The components of the computing device architecture 400 are shown in electrical communication with each other using a connection 405, such as a bus. The example computing device architecture 400 includes a processing unit (CPU or processor) 410 and a computing device connection 405 that couples various computing device components including the computing device memory 415, such as read only memory (ROM) 420 and random access memory (RAM) 425, to the processor 410.

The computing device architecture 400 can include a cache of high-speed memory connected directly with, in close proximity to, or integrated as part of the processor 410. The computing device architecture 400 can copy data from the memory 415 and/or the storage device 430 to the cache 412 for quick access by the processor 410. In this way, the cache can provide a performance boost that avoids processor 410 delays while waiting for data. These and other modules can control or be configured to control the processor 410 to perform various actions. Other computing device memory 415 may be available for use as well. The memory 415 can include multiple different types of memory with different performance characteristics. The processor 410 can include any general-purpose processor and a hardware or software service, such as service 1 432, service 2 434, and service 3 436 stored in storage device 430, configured to control the processor 410 as well as a special-purpose processor where software instructions are incorporated into the processor design. The processor 410 may be a self-contained system, containing multiple cores or processors, a bus, memory controller, cache, etc. A multi-core processor may be symmetric or asymmetric.

To enable user interaction with the computing device architecture 400, an input device 445 can represent any number of input mechanisms, such as a microphone for speech, a touch-sensitive screen for gesture or graphical input, keyboard, mouse, motion input, speech and so forth. An output device 435 can also be one or more of a number of output mechanisms known to those of skill in the art, such as a display, projector, television, speaker device, etc. In some instances, multimodal computing devices can enable a user to provide multiple types of input to communicate with the computing device architecture 400. The communications interface 440 can generally govern and manage the user input and computing device output. There is no restriction on operating on any particular hardware arrangement and therefore the basic features here may easily be substituted for improved hardware or firmware arrangements as they are developed.

Storage device 430 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 425, read only memory (ROM) 420, and hybrids thereof. The storage device 430 can include services 432, 434, 436 for controlling the processor 410. Other hardware or software modules are contemplated. The storage device 430 can be connected to the computing device connection 405. In one aspect, a hardware module that performs a particular function can include the software component stored in a computer-readable medium in connection with the necessary hardware components, such as the processor 410, connection 405, output device 435, and so forth, to carry out the function.

For clarity of explanation, in some instances the present technology may be presented as including individual functional blocks including functional blocks comprising devices, device components, steps or routines in a method implemented in software, or combinations of hardware and software.

In some instances, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples and aspects thereof, but those skilled in the art will recognize that the application is not limited thereto. Thus, while illustrative examples and aspects of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, examples and aspects of the systems and techniques described herein can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Methods and apparatus of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Such methods may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A method comprising:

receiving sensor data associated with a brine stream from one or more sensors;

identifying an oxidation reduction potential (ORP) value of the brine stream from the sensor data when the brine stream includes silica and one or more elements of a silica compound;

identifying a measure of reducing agent to add to the brine stream according to an ORP control rule that specifies that the one or more elements of the silica compound should be maintained in an oxidation state such that formation of the silica compound is mitigated;

controlling addition of the measure of the reducing agent to the brine stream to mitigate the formation of the silica compound based on the one or more elements being maintained in the oxidation state;

removing a portion of a concentration of hydrogen sulfide ($H_2S$) of the brine stream via air flux;

providing the brine stream to a separation system based on the ORP value of the brine stream being controlled when the measure of the reducing agent is added to the brine stream according to the ORP control rule;

identifying the concentration of $H_2S$ of the brine stream;

identifying the portion of the $H_2S$ of the concentration of $H_2S$ to remove from the brine stream;

removing the portion of the $H_2S$ from the brine stream based on operation of an $H_2S$ mitigation system; and injecting the portion of the $H_2S$ into a lithium-depleted brine, wherein the reducing agent comprises sodium sulfite ($Na_2SO_3$).

2. The method of claim 1, further comprising:

identifying metrics to include in a calculation that identifies the measure of the reducing agent to add to the brine stream wherein at least one element of the one or more elements of the silica compound is iron and the ORP control rule specifies that a plus (+2) oxidation state of the iron should be maintained; and initiating the calculation that identifies the measure of the reducing agent to add to the brine stream to maintain the +2 oxidation state of the iron.

3. The method of claim 1, further comprising:

identifying that a second ORP value corresponds to an ORP warning threshold;

initiating an alarm based on the second ORP value corresponding to the ORP warning threshold; and terminating the brine stream.

4. The method of claim 1, further comprising:

providing a subset of the portion of the $H_2S$ removed for use as the reducing agent.

5. The method of claim 1, further comprising:

collecting data that identifies a volumetric or mass flow rate of the brine stream over a time period, values of ORP over the time period, and measures of reducing agent added to the brine stream over the time period; and providing the collected data to train a computer model, wherein the computer model is trained based on the volumetric or mass flow rate of the brine stream over the time period, values of ORP over the time period, and measures of reducing agent added to the brine stream over the time period.

6. The method of claim 1, further comprising:

collecting data that identifies a volumetric or mass flow rate of the brine stream over a time period, values of $H_2S$ concentration over the time period, values of ORP over the time period, and measures of reducing agent added to the brine stream over the time period; and providing the collected data to train a computer model, wherein the computer model is trained based on the volumetric or mass flow rate of the brine stream over the time period, the values of $H_2S$ concentration over the time period, the values of ORP over the time period, and measures of reducing agent added to the brine stream over the time period.

7. A non-transitory computer-readable storage medium having embodied thereon instructions executable by one or more processors to:

access sensor data received from one or more sensors disposed in a brine stream;

identify an oxidation reduction potential (ORP) value from the sensor data when the brine stream includes silica and one or more elements of a silica compound;

identify a measure of reducing agent to add to the brine stream according to an ORP control rule that specifies that the one or more elements of the silica compound should be maintained in an oxidation state such that formation of the silica compound is mitigated;

control addition of the measure of the reducing agent to the brine stream to mitigate the formation of the silica compound based on the one or more elements being maintained in the oxidation state;

remove a portion of a concentration of hydrogen sulfide ($H_2S$) of the brine stream via air flux;

provide the brine stream to a separation system based on the ORP value of the brine stream being controlled when the measure of the reducing agent is added to the brine stream according to the ORP control rule;

identify the concentration of $H_2S$ of the brine stream;

identify the portion of the $H_2S$ of the concentration of $H_2S$ to remove from the brine stream;

remove the portion of the $H_2S$ from the brine stream based on operation of an $H_2S$ mitigation system; and inject the portion of the $H_2S$ into a lithium-depleted brine, wherein the reducing agent comprises sodium sulfite ($Na_2SO_3$).

8. The non-transitory computer-readable storage medium of claim 7, wherein the one or more processors execute the instructions to:

identify metrics to include in a calculation that identifies the measure of the reducing agent to add to the brine stream wherein at least one element of the one or more elements of the silica compound is iron and the ORP control rule specifies that a plus (+2) oxidation state of the iron should be maintained; and initiate the calculation that identifies the measure of the reducing agent to add to the brine stream to maintain the +2 oxidation state of the iron.

9. The non-transitory computer-readable storage medium of claim 7, wherein the one or more processors execute the instructions to:

identify that a second ORP value corresponds to an ORP warning threshold;

initiate an alarm based on the second ORP value corresponding to the ORP warning threshold; and terminate the brine stream.

10. The non-transitory computer-readable storage medium of claim 7, wherein the one or more processors execute the instructions to:

provide a subset of the portion of the $H_2S$ removed for use as the reducing agent.

11. The non-transitory computer-readable storage medium of claim 7, wherein the one or more processors execute the instructions to:

collect data that identifies a volumetric or mass flow rate of the brine stream over a time period, values of ORP over the time period, and measures of reducing agent added to the brine stream over the time period; and provide the collected data to train a computer model, wherein the computer model is trained based on the volumetric or mass flow rate of the brine stream over the time period, values of ORP over the time period, and measures of reducing agent added to the brine stream over the time period.

12. The non-transitory computer-readable storage medium of claim 7, wherein the one or more processors execute the instructions to:

collect data that identifies a volumetric or mass flow rate of the brine stream over a time period, values of $H_2S$ concentration, values of ORP over the time period, and measures of reducing agent added to the brine stream over the time period; and provide the collected data to train a computer model, wherein the computer model is trained based on the volumetric or mass flow rate of the brine stream over the time period, the values of $H_2S$ concentration over the time period, the values of ORP over the time period, and measures of reducing agent added to the brine stream over the time period.

13. An apparatus comprising:

a valve;

one or more sensors disposed along a brine stream;

a memory;

one or more processors that execute instructions out of the memory to:

access sensor data associated with a brine stream received from the one or more sensors, identify an oxidation reduction potential (ORP) value from the sensor data when the brine stream includes silica and one or more elements of a silica compound, identify a measure of reducing agent to add to the brine stream according to an ORP control rule that specifies that the one or more elements of the silica compound should be maintained in an oxidation state such that formation of the silica compound is mitigated, remove a portion of a concentration of hydrogen sulfide ($H_2S$) of the brine stream via air flux, and control operation of the valve to add the measure of the reducing agent to the brine stream to mitigate the formation of the silica compound based on the one or more elements being maintained in the oxidation state, and allow the brine stream to be provided to a separation system based on the ORP value of the brine stream being controlled when the measure of the reducing agent is added to the brine stream according to the ORP control rule;

identify the concentration of $H_2S$ of the brine stream;

identify the portion of the $H_2S$ of the concentration of $H_2S$ to remove from the brine stream;

remove the portion of the $H_2S$ from the brine stream based on operation of an $H_2S$ mitigation system; and inject the portion of the $H_2S$ into a lithium-depleted brine, wherein the reducing agent comprises sodium sulfite ($Na_2SO_3$).

14. The apparatus of claim 13, wherein the one or more processors execute the instructions to:

identify metrics to include in a calculation that identifies the measure of the reducing agent to add to the brine stream wherein at least one element of the one or more elements of the silica compound is iron and the ORP control rule specifies that a plus (+2) oxidation state of the iron should be maintained, and initiate the calculation that identifies the measure of the reducing agent to add to the brine stream to maintain the +2 oxidation state of the iron.

15. The apparatus of claim 13, wherein the one or more processors execute the instructions to:

identify that a second ORP value corresponds to an ORP warning threshold, initiate an alarm based on the second ORP value corresponding to the ORP warning threshold; and terminate the brine stream.

16. The apparatus of claim 13, wherein the one or more processors execute the instructions to:

provide a subset of the portion of the $H_2S$ removed for use as the reducing agent.

17. The apparatus of claim 13, wherein the one or more processors execute the instructions to:

collect data that identifies a volumetric or mass flow rate of the brine stream over a time period, values of ORP over the time period, and measures of reducing agent added to the brine stream over the time period; and provide the collected data to train a computer model, wherein the computer model is trained based on the volumetric or mass flow rate of the brine stream over a time period, values of ORP over the time period, and measures of reducing agent added to the brine stream over the time period.

* * * * *